United States Patent [19]
Bodenas et al.

[11] Patent Number: 5,989,601
[45] Date of Patent: *Nov. 23, 1999

[54] MEAT PRODUCT PREPARATION BY INCORPORATING FERMENTED MEAT TRIMMINGS AND EXTRA FAT IN A MEAT PIECE

[75] Inventors: Lars Goeran Bodenas, Munka Ljungby, Sweden; Jonas Peter Halden, Seuzach, Switzerland; Kjell Olsson, Angelholm, Sweden

[73] Assignee: Nestec S.A., Vevey, Switzerland

[ * ] Notice: This patent is subject to a terminal disclaimer.

[21] Appl. No.: 08/964,965

[22] Filed: Nov. 5, 1997

[30] Foreign Application Priority Data

Nov. 6, 1996 [EP] European Pat. Off. ............. 96203097

[51] Int. Cl.[6] ............................. A23L 1/314; A23L 1/318
[52] U.S. Cl. ............................ 426/59; 426/281; 426/641; 426/646
[58] Field of Search ................................ 426/55, 56, 281, 426/641, 646, 59

[56] References Cited

U.S. PATENT DOCUMENTS

| | | |
|---|---|---|
| 1,129,868 | 3/1915 | Hoy . |
| 2,907,661 | 10/1959 | Niven et al. . |
| 3,821,445 | 6/1974 | Okamura et al. ........................ 426/370 |
| 4,229,458 | 10/1980 | Dreano et al. ........................... 426/264 |
| 4,254,151 | 3/1981 | Townsend ................................ 426/231 |
| 4,304,868 | 12/1981 | Gryczka et al. ......................... 435/253 |
| 4,362,750 | 12/1982 | Swartz ...................................... 426/59 |
| 4,402,987 | 9/1983 | von Lersner et al. .................. 426/281 |
| 4,539,210 | 9/1855 | O'Connell et al. ...................... 426/56 |
| 4,579,740 | 4/1986 | Mantrozza ................................. 426/59 |
| 4,728,518 | 3/1988 | Gonzalez et al. ......................... 426/56 |
| 4,847,097 | 7/1989 | Boudreaux et al. ...................... 426/56 |
| 4,886,673 | 12/1989 | Hammes ................................... 426/56 |
| 4,960,599 | 10/1990 | Cozzini et al. .......................... 426/281 |
| 5,015,487 | 5/1991 | Collison et al. ......................... 426/332 |
| 5,374,433 | 12/1994 | Bowling et al. ............................ 426/8 |
| 5,576,035 | 11/1996 | Bowling et al. ............................ 426/8 |
| 5,827,550 | 10/1998 | Berglund et al. ......................... 426/59 |

FOREIGN PATENT DOCUMENTS

| | | |
|---|---|---|
| 0770336 | 5/1997 | European Pat. Off. . |
| 3500914 | 7/1986 | Germany . |
| 3502063 | 7/1986 | Germany . |
| 1530476 | 11/1978 | United Kingdom . |
| 8400283 | 2/1984 | WIPO . |

OTHER PUBLICATIONS

Banwright, *Basic Food Microbiology*, The AVI Publishing Company, Inc., Westport, Connecticut, 1981, pp. 285–287, 293 and 294.

Romans et al., *The Meat We Eat,* The Interstate Printers and Publishers, Inc., Danville, Illinois, 1977, pp. 564–566.

Komarick et al., *Food Products Formulary, vol. 1, Meats, Poultry, Fish, Shellfish,* The AVI Publishing Company, Inc., Westport, CT, 1974, pp. 26–33 & 38–55.

Gerrard, *Sausage and Small Goods Production,* Leonard Hill Books, London, England, 1969, pp. 94–96, 98–101.

Database Abstract, Derwent Information Ltd., WPI Accession No. 86–197874/198631, Abstract of German Patent Application Publication No. DE–35 02 063 A1 (1986).

Database Abstract, Derwent Information Ltd., WPI Accession No. 86–190396/30, Abstract of German Patent Application Publication No. DE–3500 914 A1 (1986).

*Primary Examiner*—Arthur L. Corbin
*Attorney, Agent, or Firm*—Vogt & O'Donnell, LLP

[57] ABSTRACT

Prior to incorporating meat trimmings into a meat piece, particles of the trimmings are fermented with bacteria to obtain fermented trim particles for incorporating into a meat piece and fat is added to the trimmings before the trimmings are particulated, or to the trim particles before fermentation or to the trim particles during fermentation so that the added fat is present during fermentation for obtaining a mixture of fermented trim particles and added fat, and after fermentation, the mixture is frozen and then suspended in a brine or pickle or marinade and then the suspension is incorporated into a meat piece.

22 Claims, No Drawings

MEAT PRODUCT PREPARATION BY INCORPORATING FERMENTED MEAT TRIMMINGS AND EXTRA FAT IN A MEAT PIECE

BACKGROUND OF THE INVENTION

The present invention relates to incorporation of substances into meat, including incorporation, particularly, of meat trimmings into meat.

Meat trimmings are obtained by removal from meat during the standard preparation of whole cuts of meat in the meat industry. The trimmings are usually, but not always, of low quality and usually contain some fat (about 10–12% by weight) and some muscle tissue. It is possible, by using technology introduced onto the market in recent years, to incorporate suspensions made of meat trimmings into whole cuts of like meat to increase the weight using a multi-needle injector. By controlling parameters such as the amount of trimmings injected, the meat/fat ratio and the quality of the meat, this technology enables the production of cooked ham or marinated meat products without affecting the standard quality with regard to flavour or shelf-life and without visibility of the suspension, and a way to improve binding and yield is described in U.S. Pat. No. 4,960,599. The cost saving of injecting trimmings is considerable when the trimmings are of low value compared to whole cuts of meat.

In order to impart a specificity to the flavour and to improve microbiological stability, it has been proposed to ferment raw meat by using a starter culture in a brine or marinade prior to cooking to produce bacteriocins. However, since the raw meat can under no circumstances be allowed to ferment at a temperature higher than about +8° C. prior to cooking, the biggest problem is to find a starter culture that can produce bacteriocins and a specific flavour at low temperature. We have tested some commercially available cultures, but the effect on the final quality of the product regarding flavour and microbiological stability is minimal. In addition, the production time before the cooking step must be prolonged considerably.

As described in European Patent 0,770,336, it was found that by applying a fermentation step with a starter culture in the meat trimmings prior to incorporation into meat, it was possible to adapt the fermentation parameters such as temperature, time, humidity and ingredients, etc., to their optimal values. As described in that application there is provided a process for preparing meat containing meat trimmings therein which comprises incorporating a frozen suspension of meat trimmings in a brine, marinate or pickle into chilled meat characterised in that before freezing, the meat trimmings are fermented with a starter culture.

SUMMARY OF THE INVENTION

Although, as stated above, meat trimmings usually contain about 10–12% by weight of fat, we have found surprisingly that, by incorporating extra fat into the meat trimmings, the final flavour intensity of the meat can be significantly improved.

According to the present invention, there is provided a process for preparing meat containing meat trimmings therein which comprises fermenting meat trimmings with a starter culture, freezing the fermented meat trimmings and incorporating a frozen suspension of the meat trimmings in a brine, marinate or pickle into chilled meat characterised in that fat is added to the meat trimmings. The fat preferably is added to the meat trimmings before or during fermentation.

DETAILED DESCRIPTION OF THE INVENTION

The meat used in the process of the present invention may be obtained from all types of meat such as pork, beef, lamb, poultry and fish. The meat trimmings used are preferably those removed from the actual piece of meat to be treated, but it also is possible to use meat trimmings from the same type of meat as the meat to be treated. It also is possible to use meat trimmings from a type of meat other than the type of meat to be treated, although this is generally less preferred. For obtaining the trimmings, for example, raw whole cuts of meat may be chilled, e.g., to a temperature from −2° to +12° C., preferably from 2° to 10° C. and especially from 3° to 8° C., deboned and the trimmings may be removed in the usual manner.

In carrying out the present invention, the amount of fat added to the meat trimmings may depend on the requirements but usually to obtain an improvement in flavour, at least 10% and preferably at least 20% by weight of fat based on the weight of the mixture of fat and meat trimmings is added. Typically, for optimum improvement of flavour, the amount of fat added is from 25 to 75%, preferably from 30 to 70% and especially from 40 to 60% by weight of fat based on the weight of the mixture of fat and meat trimmings. It should be understood that since meat trimmings normally contain about 10–12% fat, the total amount of fat in the mixture is about 10–12% more than the fat added.

The fat used for adding to the meat trimmings is preferably that removed from the thick fat layer of the actual piece of meat to be treated, but it is also possible to use fat from the thick fat layer of the same type of meat as the meat to be treated. It is also possible to use fat from the thick fat layer of a type of meat other than the type of meat to be treated, although this is generally less preferred. The fat is preferably pork fat, but other food acceptable fats such as animal fats or vegetable oils may be used, if desired.

The mixture of fat and meat trimmings may be incorporated into trimmed whole meat cuts as such or into smaller portions of meat formed by dividing the whole meat cuts into pieces having an average diameter of from 0.5 to 10 cm, more conveniently from 1 to 5 cm.

When the mixture of fat and meat trimmings is incorporated into whole cuts of meat, this may be carried out conventionally by injection, using for instance a multi-needle injector. When the mixture of fat and meat trimmings is incorporated into smaller portions of meat, this may be carried out by mixing the mixture of fat and meat trimmings with the smaller portions of meat, e.g. with agitation such as stirring or tumbling. For example, a suspension of the mixture of fat and meat trimmings may be added directly to a tumbler.

Before fermentation, mixture of fat and meat trimmings is conveniently ground until the majority of the particles have a size of less than 30 mm diameter and their average particle size is from 1 mm to 5 mm, preferably from 2 mm to 4 mm diameter.

Before, during or after the addition of the starter culture, the ground mixture of fat and meat trimmings is preferably mixed with a brine, pickle or marinade. As is well known, a pickle is used for preserving meat and may contain brine, or other salt, vinegar or acid liquor, while a marinade is used for flavouring meat and may contain brine, vinegar or wine, oil, spices and herbs, etc. Black pepper may advantageously be added. For instance, the mixture of fat and meat trimmings may be mixed with sugar and a nitrite salt such as sodium nitrite. The pH of the mixture is usually in the range of from about 5.2 to 6.3, preferably from 5.5 to 6.0.

Suitable starter cultures may be obtained from Lactobacillus, Streptococcus, Pediococcus or Staphylococcus species and preferable strains are *lactobacillus sake* (*L.* saki), *Pediococcus acidilati* (*P. acidilati*) and *Staphylococcus carnosus*. The starter culture may be mixed in water, as is conventional, before addition to the meat trimmings. The amount of starter culture used may be from 0.1 to 10 ml, preferably from 0.5 to 5 ml and especially from 0.75 to 2.5 ml per kg of ground fat and meat trimmings. The mixture of ground fat and meat trimmings and the starter culture in the brine, pickle or marinade is advantageously packed in a vessel or bin suitable for fermentation such as a plastic bag or pouch within which fermentation is allowed to proceed. The cell concentration before fermentation is preferably from $10^6$ to $10^7$ cells /g. The fermentation may take place at a temperature of from 0° to 55° C., preferably from 8° to 45° C. and more preferably from 15° to 40° C. over a period of from about 12 hours to about 7 days, preferably from 18 hours to 5 days. During the early stages of the fermentation, e.g. after a period of from about 6 to 30 hours and more usually after a period of from 12 to 24 hours, the pH falls, for instance to pH 5.2 or 5.3 or below. The cell concentration after fermentation is preferably from $10^8$ to $10^9$ cells/g.

After the fermentation, the fermented mixture of ground fat and meat trimmings is frozen, e.g. to a temperature from −5° to −30° C., preferably from −15° to −25° C. After freezing, the fermented ground meat trimmings are advantageously flaked, e.g. to particles having a maximum volume of about 2 cc, preferably a maximum volume of 1 cc.

After freezing, a frozen brine, pickle or marinade may be mixed with the fermented mixture of ground fat and meat trimmings to form a suspension. The mixing may be performed by emulsifying one or more times, e.g. up to four times. The ratio of brine, pickle or marinade to the fermented mixture of ground trimmings and fat may be from 1:1 to 20:1, preferably from 1.5:1 to 15:1 and more preferably from 2:1 to 9:1. For example a brine may consist of a mixture of nitrite salt, sugar, ascorbate and water. The nitrite and ascorbate salts are conveniently the sodium salts.

The frozen suspension of the mixture of fat and meat trimmings in a brine, marinate or pickle is then warmed to a temperature of not greater than +1° C., for instance about −2° to −10° C., preferably from −4° to −8° C. and incorporated into the chilled meat. Although it is possible to warm the suspension to a temperature up to 5° C., if the suspension contains less than 25% meat, especially less than 10% meat, there is no clear advantage to do so. The temperature of the suspension should preferably not exceed +1° C., otherwise proteins would be extracted which would cause the suspension to thicken rapidly and this may cause subsequent clogging of needles when the mixture of fat and meat trimmings is injected into the meat with needles.

The amount of mixture of fat and meat trimmings incorporated into the meat may vary, e.g. up to 15%, conveniently from 1 to 10% and preferably from 2 to 6% by weight based on the weight of the meat. During the incorporation of the suspension of the mixture of fat and meat trimmings into the meat, especially by injection, a portion of the suspension is squeezed out of the meat and may be returned to the batch containing the mixture of fat and meat trimmings with brine where it is chilled down again. Any portion of the suspension returned is preferably emulsified at least once, more preferably at least two or three times, with the next batch because it may contain small meat particles which are disrupted from the muscles during injection and which could cause clogging of the needles. When the mixture of fat and meat trimmings is incorporated by injection, a part of the suspension of the mixture of fat and meat trimmings is preferably added separately so that some may be absorbed during tumbling since it is not usually possible to incorporate the exact desired percentage of suspension by injection.

After the injection, the meat may be processed conventionally.

The meat product may be a chilled product which is either non-cooked or cooked, or it may be frozen, preferably marinated, or dried. Examples of non-cooked chilled meat products are Lardon, bacon, cold smoked ham, etc. An example of a cooked and chilled meat product is cooked ham. For a cooked, chilled product such as cooked ham, the meat may undergo tenderisation, tumbling, moulding, cooking, chilling, storage, slicing and packaging by conventional methods such as are well known in the art. Advantageously, for a meat product which is cooked, such as cooked ham, the meat may be fermented prior to the cooking process. The process of the present invention may provide protection against undesirable bacteria such as Listeria in chilled products and improved flavour in frozen and dried products.

EXAMPLES

The following Examples further illustrates the present invention. Parts and percentages are by weight.

Example 1

A whole ham was chilled to 5° C. and trimmed by removing fat, sinews, etc., before separating the ham into different whole meat cuts. The trimmings removed from the whole ham were mixed with an equal amount of pork fat obtained from the thick fat layer of the same ham and ground in a Kilia grinder to an average particle size of 3 mm, mixed in a Hobart mixer with 1% dextrose, 2% nitrite salt and 1.0% of a starter culture of *L. sake* containing $10^6$ to $10^7$ bacteria per gram of the mixture of fat and trimmings. The mixture was packed under soft vacuum into plastic pouches and fermented at 25° C. for 36 hours. The pH fell rapidly during the first day from an initial value of pH6 to pH5 and the cell count increased to $10^8$ to $10^9$ cells/g.

After fermentation, the fermented mixture was packed into whole bags and frozen to −20° C., flaked in a magurit flaker to particles having dimensions of 0.5×0.5×0.5 cm and warmed to −15° C. A brine at −8° C. composed of 10.08% sodium nitrite, 0.18% of sodium ascorbate, 2.28% of dextrose and 87.46% of water (corresponding to an injection level of 40.5% and a 7% level of the mixture of fat and trimmings in the final product) in a ratio of 3 parts brine to 1 part of the mixture of fat and trimmings. The mixing was carried out by emulsifying three times to form a suspension. The suspension was then injected at −6° C. into one of the whole cuts of ham through a multi-needle injector and the ham containing the mixture of fat and trimmings was then subjected to tenderisation, tumbling, moulding, cooking, chilling, storage, slicing and finally packaging by conventional methods.

The chilled cooked ham had a significantly enhanced ham flavour when compared with a similar product containing meat trimmings which had been fermented in a similar manner but in the absence of added fat.

Example 2

A similar process to that described in Example 1 was followed except that the injection level of the suspension was only 23% instead of the 40.5% level used in Example 1, thereby giving an addition of only 4% of the mixture of fat and trimmings in the final product instead of 7% in Example 1.

The chilled cooked ham had had a significantly enhanced ham flavour when compared with a similar product containing meat trimmings which had been fermented in a similar manner but in the absence of added fat.

We claim:

1. In a process for preparing a meat product having meat trim particles incorporated into meat wherein meat trimmings are ground to particles, the meat trim particles are frozen and combined with a brine, pickle, or marinade medium to obtain a suspension which is incorporated into a meat piece, the improvements comprising, prior to freezing the meat trim particles, inoculating the meat particles with a bacteria starter culture and fermenting the meat particles with the bacterial from the culture to obtain fermented meat particles and adding a fat to a member selected from the group consisting of the meat trimmings, the meat trim particles prior to fermenting and the meat trim particles being fermented, so that the added fat is present during the fermenting step, and then obtaining, from the fermenting step, a mixture comprising fermented meat trim particles and added fat for incorporation into the meat piece.

2. A process for preparing a meat product comprising grinding meat trimmings to obtain meat trim particles, inoculating the meat trim particles with a bacteria starter culture, and fermenting the meat trim particles with the bacteria from the culture to obtain fermented meat particles and adding a fat to a member selected from the group consisting of the meat trimmings, the meat trim particles prior to fermenting and the meat trim particles during fermenting, so that added fat is present during the fermenting step and then obtaining, from the fermenting step, a mixture comprising fermented meat trim particles and added fat, freezing the fermented trim particles and added fat mixture to obtain a frozen mixture, mixing the frozen mixture with a medium selected from the group consisting of a brine, a pickle and a marinade to obtain a suspension and incorporating the suspension into a piece of meat to obtain the meat product, and wherein the temperature of the suspension, prior to incorporating into the meat piece, does not exceed 1° C.

3. A process according to claim 1 or 2 wherein the added fat present during the fermentation is in an amount of at least 10% by weight based upon the total weight of the fermented trim particles and added fat.

4. A process according to claim 3 wherein the fermented trim particles and added fat mixture is incorporated into the meat piece so that the composition is present in the meat piece in an amount of up to 15% by weight based upon the meat piece weight.

5. The product of the process of claim 4.

6. A process according to claim 3 wherein, by weight, the medium and the fermented particles and added fat mixture are in a ratio of medium to mixture of from 1:1 to 20:1.

7. A process according to claim 1 or 2 wherein the added fat present during the fermentation is from 25% to 75% by weight based upon the total weight of the fermented trim particles and added fat.

8. A process according to claim 1 or 2 wherein the fermented trim particles and added fat mixture is incorporated into the meat piece so that the mixture is present in the meat piece in an amount of up to 15% by weight based upon the meat piece weight.

9. A process according to claim 1 or 2 wherein, by weight, the medium and the fermented particles and added fat mixture are in a ratio of medium to mixture of from 1:1 to 20:1.

10. A process according to claim 1 or 2 wherein the fat is added to and ground with the trimmings to obtain a trimmings and fat particle mixture having an average particle size of less than 30 mm.

11. A process according to claim 1 or 2 wherein, during the fermenting step, the meat trim particles and added fat mixture is contained in a medium selected from the group consisting of a brine, a pickle and a marinade so that the fermented mixture obtained further comprises the medium, and then freezing the fermented mixture for incorporation into the meat piece.

12. A process according to claim 11 wherein the fermented mixture which further comprises the medium has a pH of from 5.2 to 6.3.

13. A process according to claim 1 or 2 wherein the starter culture bacteria is selected from the group consisting of Lactobacillus, Streptococcus, Pediococcus and Staphylococcus.

14. A process according to claim 1 or 2 wherein the starter culture bacteria is *Lactobacillus sake*.

15. A process according to claim 1 or 2 wherein the starter culture bacteria is selected from the group consisting of *Pediococcus acidilacti* and *Staphylococcus carnosus*.

16. A process according to claim 1 or 2 wherein the meat trim particles are inoculated with the starter culture bacteria in an amount of from 0.1 ml to 10 ml starter culture bacteria per kg meat trim particles and added fat.

17. A process according to claim 2 wherein the meat piece into which the suspension is incorporated has a temperature of from 12° C. to −2° C.

18. A process according to claim 2 wherein the frozen mixture has a temperature of from −5° C. to −30° C.

19. A process according to claim 2 further comprising flaking the frozen particles to form particles having a maxium volume of about 2 cc.

20. A process according to claim 2 wherein the suspension is incorporated into the meat piece by a method selected from the group consisting of injecting the suspension into the meat piece and tumbling the meat piece with the suspension to incorporate the suspension.

21. The product of the process of claim 1.

22. The product of the process of claim 2.

* * * * *

UNITED STATES PATENT AND TRADEMARK OFFICE
CERTIFICATE OF CORRECTION

PATENT NO. : 5, 989, 601
DATED : November 23, 1999
INVENTOR(S) : Lars Goeran BODENAS, *et al.*

It is certified that error appears in the above-identified patent and that said Letters Patent is hereby corrected as shown below:

On the title page, under the left-hand column heading "References Cited, U.S. PATENT DOCUMENTS", in the listing for U.S. Pat. No. 4,539, 210 (O'Connell, et al.), delete "9/1855" and insert therefor -- 9/1985 --.

Column 5, line 12 (line 9 of claim 1), delete "bacterial" and insert therefor -- bacteria --.

Signed and Sealed this

Eleventh Day of July, 2000

*Attest:*

*Attesting Officer*

Q. TODD DICKINSON

*Director of Patents and Trademarks*